(12) United States Patent
Perdigon et al.

(10) Patent No.: US 8,911,560 B2
(45) Date of Patent: Dec. 16, 2014

(54) STREAK-FREE FORMULATIONS FOR CLEANING AND COATING HARD SURFACES

(71) Applicant: Rohm and Haas Company, Philadelphia, PA (US)

(72) Inventors: Valerie Perdigon, Comps sur Artuby (FR); Theodore Tysak, Ambler, PA (US)

(73) Assignee: Rohm and Haas Company

( * ) Notice: Subject to any disclaimer, the term of this patent is extended or adjusted under 35 U.S.C. 154(b) by 0 days.

(21) Appl. No.: 13/929,046

(22) Filed: Jun. 27, 2013

(65) Prior Publication Data

US 2014/0005095 A1  Jan. 2, 2014

(30) Foreign Application Priority Data

Jun. 27, 2012 (EP) ................................ 12290210

(51) Int. Cl.
| | |
|---|---|
| *B08B 3/04* | (2006.01) |
| *C11D 1/722* | (2006.01) |
| *C11D 3/43* | (2006.01) |
| *C11D 3/37* | (2006.01) |
| *C09G 1/16* | (2006.01) |

(52) U.S. Cl.
CPC .............. *C11D 3/3765* (2013.01); *C11D 1/722* (2013.01); *C09G 1/16* (2013.01); *C11D 3/43* (2013.01)
USPC ............. 134/25.2; 134/25.3; 134/39; 134/42; 510/421; 510/432; 510/434; 510/475; 510/477; 510/505; 510/514; 510/524; 510/525

(58) Field of Classification Search
CPC ........ B08B 3/04; C11D 1/722; C11D 3/3707; C11D 3/3757; C11D 3/43
USPC ......... 510/421, 432, 434, 475, 477, 505, 514, 510/524, 525; 134/25.2, 25.3, 39, 42
See application file for complete search history.

(56) References Cited

U.S. PATENT DOCUMENTS

| | | |
|---|---|---|
| 5,126,068 A | 6/1992 | Burke et al. |
| 5,866,527 A | 2/1999 | Mertens |
| 2011/0118409 A1 | 5/2011 | Eichman et al. |
| 2011/0152425 A1 | 6/2011 | Tysak et al. |

FOREIGN PATENT DOCUMENTS

| | | | |
|---|---|---|---|
| DE | 3133529 A1 | 4/1982 | |
| EP | 308221 * | 3/1989 | ............. C11D 1/825 |
| EP | 0308221 A1 | 3/1989 | |
| JP | 2002-226887 A | 8/2002 | |
| JP | 2004107586 A | 4/2004 | |

OTHER PUBLICATIONS

European Search Report for EP12290210.9 dated Dec. 3, 2012.
Notification of Reasons for Refusal in Japanese patent application No. 2013-114864 dated Jun. 4, 2014.

* cited by examiner

*Primary Examiner* — Brian P Mruk
(74) *Attorney, Agent, or Firm* — Raef M. Shaltout

(57) ABSTRACT

The present invention relates to formulations for cleaning hard surfaces and leaving a glossy, streak-free finish thereon, the formulations comprising one or more liquid solvents, one or more film-forming polymers and one or more polymer surfactants comprising polymerized units derived from ethylene oxide and butylenes oxide.

9 Claims, No Drawings

STREAK-FREE FORMULATIONS FOR CLEANING AND COATING HARD SURFACES

FIELD OF THE INVENTION

The present invention relates to a formulation containing one or more polymer surfactants each containing polymerized units derived from ethylene oxide and butylene oxide, and one or more film-forming polymer compounds, and which is useful for cleaning oil, grease and dirt from hard surfaces while leaving such surfaces streak free.

BACKGROUND OF THE INVENTION

Hard surfaces such as floors, counters, walls, tables, and other things made of laminate, ceramic, and plastic materials need to be cleaned periodically of accumulated dirt, oil, grease, and other contaminants. The appearance of such hard surfaces after cleaning is very important to consumers. More particularly, not only must hard surface cleaning formulations provide a clean surface, but the cleaned surface should also be visually appealing, which typically means having a glossy or shiny appearance. Most importantly, the shiny appearance must be free of streaking or surface anomalies that detract from the glossy appearance. Industry has worked to develop hard surface cleaning formulations which provide good shine performance with no streaking.

For example, it is known that the use of polymer surfactants which comprise ethylene oxide and propylene oxide in hard surface cleaning formulations provide good cleaning results. Tokkai 2004-107586 (Tokugan 2002-275634) describes floor polish formulations containing polymer surfactants which include units derived from ethylene oxide (EO) and propylene oxide (PO) units and which were developed to replace tributoxy ethyl phosphate compounds as leveling agents for floor polish formulations. The OE-PO-based surfactants used in the floor polish formulations of Tokkai 2004-107586 provide some gloss, but result in streaking on the cleaned surfaces.

United States Patent Application Publication No. 2011/0152425 describes coating formulations comprising water insoluble polymers with acid functional residues, as well as one more leveling agents, also comprising EO and PO, and having the following formula:

$$R-O-(-CH_2-CH_2-CH_2-O-)_x-(-CH_2-CH_2-O-)_y-H$$

where x=0.5 to 10, y=2 to 20, and R is a mixture of two or more linear alkyl moieties having an even number of carbon atoms between 4 and 20. The coating formulations described in US2011/0152425 also fail to provide streak-free coatings on cleaned hard surfaces.

Industry would welcome cleaning formulations for application to hard surfaces that provide clean, smooth, streak-free surfaces. It is important that such cleaning formulations spread evenly when applied to hard surfaces. It is also desirable that the cleaning formulations are clear and remain stable during storage.

SUMMARY OF THE INVENTION

The present invention provides a formulation for cleaning hard surfaces comprising: A) one or more liquid solvents; B) one or more film-forming polymers; and C) one or more polymer surfactants, each comprising polymerized units derived from ethylene oxide and butylene oxide and having the following general Formula I:

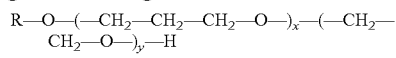

Formula I wherein $R_a$ is one or more independently straight chain or branched alkyl groups or alkenyl groups having 3-22 carbon atoms, EO is a polymerized unit derived from ethylene oxide, m is from 1 to 12, BO is a polymerized unit derived from butylene oxide, and n is from 1 to 8. Application of the formulation to hard surfaces provides a shiny appearance free of streaking.

In some embodiments, for example, the formulation may comprise from 20% to 80% by weight of the one or more liquid solvents; from 5% to 80% by weight of the one or more film-forming polymers; and from 0.5% to 10% by weight of the one or more polymer surfactants comprising polymerized units derived from ethylene oxide and butylene oxide, based on the total weight of the formulation.

The $R_a$ group of the one or more polymer surfactants may be a straight chain $C_{12}$ hydrocarbon, m may be from 9 to 12, and n may be from 1 to 3.

At least one of the film-forming polymers is an acrylic polymer comprising polymerized units derived from one or more ethylenically unsaturated monomers. The formulation of the present invention may further comprise (D) one or more alkoxide compounds.

The present invention also provides a method for providing a high gloss and streak-free finish to hard surfaces, comprising applying one or more layers of the aforesaid formulation to the hard surfaces, and allowing each layer to dry prior to use or application of another layer.

DETAILED DESCRIPTION OF THE INVENTION

The present invention provides a formulation for cleaning hard surfaces and leaving a shiny, glossy finish that is substantially streak-free. More particularly, the formulation of the present invention comprises: one or more liquid solvents; one or more film-forming polymers; and one or more polymer surfactants each comprising polymerized units derived from ethylene oxide and butylene oxide. The polymer surfactants enable the film-forming polymers dispersed in the aqueous solvent to be evenly delivered and deposited across hard surfaces during cleaning applications, leaving a glossy, streak free appearance after drying.

It is noted that, in the following description, endpoints of ranges are considered to be definite and are recognized to incorporate within their tolerance other values within the knowledge of persons of ordinary skill in the art, including, but not limited to, those which are insignificantly different from the respective endpoint as related to this invention (in other words, endpoints are to be construed to incorporate values "about" or "close" or "near" to each respective endpoint). The range and ratio limits, recited herein, are combinable. For example, if ranges of 1-20 and 5-15 are recited for a particular parameter, it is understood that ranges of 1-5,1-15, 5-20, or 15-20 are also contemplated and encompassed thereby.

All percentages stated herein are weight percentages, unless otherwise stated. As used herein, unless otherwise indicated, the phrase "molecular weight" refers to the weight average molecular weight ($MW_w$) of a polymer as measured by gel permeation chromatography (GPC). During gel permeation chromatography, the members of a distribution of polymer chains are separated according to their hydrodynamic size in solution rather than their molar mass. The system is then calibrated with standards of known molecular weight and composition to correlate elution time with molecular weight. The techniques of GPC are discussed in detail in *Modern Size Exclusion Chromatography*, W. W. Yau, J. J Kirkland, D. D. Bly; Wiley-Interscience, 1979, and in A Guide to Materials Characterization and Chemical Analysis, J. P. Sibilia; VCH, 1988, p. 81-84.

"Polymer," as used herein, means a polymeric compound prepared by polymerizing monomers, whether of the same or a different type. The generic term "polymer" includes the terms "homopolymer," "copolymer," "terpolymer" as well as "interpolymer." Also, as used herein, the terms "resin" and "polymer" are synonymous.

The term "polymerized units derived from" as used herein refers to polymer molecules that are synthesized according to polymerization techniques wherein a product polymer contains "polymerized units derived from" the constituent monomers which were the starting materials for the polymerization reactions.

"Polymerized units derived from ethylene oxide," as used herein, means monomer units have the general formula [—$CH_2CH_2O$—], which is also known as poly(oxyethylene), and is also represented hereinafter as (EO).

Similarly, "polymerized units derived from butylene oxide," as used herein, means monomer units have the general formula [—$CH_2CH_2CH_2CH_2O$—], which is also known as poly(oxybutylene), and is also represented hereinafter as (BO). The starting butylene oxide monomer may include one or more isomers such as, without limitation, 1,2 butylene oxide, 1-butene oxide, and 1,4 epoxybutane.

"Polymerized units derived from propylene oxide," as used herein, means monomer units have the general formula [—$CH_2CH_2CH_2O$—], which is also known as poly(oxypropylene), and is also represented hereinafter as (PO).

More particularly, polymer surfactants suitable for use in the formulations according to the present invention comprise polymerized units derived from ethylene oxide and butylene oxide, and have the following general Formula I:

$$R_a\text{—O-(EO)}_m\text{—(BO)}_n\text{—H} \qquad \text{Formula I}$$

wherein $R_a$ is one or more independently straight chain or branched alkyl groups or alkenyl groups having 3-22 carbon atoms, EO is a polymerized unit derived from ethylene oxide, m is from 1 to 12, BO is a polymerized unit derived from butylene oxide, and n is from 1 to 8. In some embodiments, m may be from 2 to 12, or from 2 to 10, or even from 5-12. In some embodiments, n may be from 2 to 8, or even from 3-8, or even from 5 to 8.

The polymer surfactants typically have a weight average molecular weight, $MW_w$, of from 150 to 5,000 grams/mole (Daltons), for example from 150 to 2,500 Daltons, or even from 150 to 1,500 Daltons, as measured by GPC.

Methods for preparing the polymer surfactants comprising polymerized units derived from EO and BO which are suitable for use in the formulations of the present invention are not particularly limited and include those familiar to persons of ordinary skill in the relevant art, both now and in the future. Such methods include, without limitation, emulsion polymerization, bulk polymerization, solution polymerization, free radical polymerization, and catalyzed polymerization. The polymer surfactants useful in the present invention, sometimes generally referred to as alkoxylates, are preferably prepared in a sequential manner that involves butoxylation (adding BO or poly(oxybutylene) moieties of an alcohol mixture of alcohols to form a BO block, followed by ethoxylation (adding EO or poly(oxyethylene) moieties) to form an EO block, which is attached to the BO block, but spaced apart from $R_a$ which represents alkyl moieties from the alcohol or mixture of alcohols.

The inclusion of the surfactants which comprise polymerized units derived from both ethylene oxide and butylene oxide in the formulations of the present invention provide formulations which leave hard surfaces with a shiny, glossy, streak-free appearance after application and drying on the hard surfaces. It is noted that, while formulations including previously known surfactants which comprise polymerized units derived from EO and propylene oxide (PO) provide good cleaning action and a glossy appearance, they also have a notably streaked appearance after application and drying on hard surfaces.

Suitable liquid solvents include water, water soluble solvents, and mixtures thereof. Water soluble solvents acceptable for use in the present invention may, without limitation, for example without limitation, be selected from coalescing solvents, plasticizing solvents, or combinations thereof. Suitable coalescing solvents, for example, may be selected from Butoxyethyl PROPASOL™, Butyl CARBITOL™, Butyl CELLOSOLVE™ Acetate, Butyl CELLOSOLVE™, Butyl DIPROPASOL™, Butyl PROPASOL™, CARBITOL™ PM-600, CARBITOL™ Low Gravity, CELLOSOLVE™ Acetate, CELLOSOLVE™, Ester EEP™, FILMER IBT™, Hexyl CARBITOL™, Hexyl CELLOSOLVE™, Methyl CARBITOL™, Methyl CELLOSOLVE™ Acetate, Methyl CELLOSOLVE™, Methyl DIPROPASOL™, Methyl PROPASOL™ Acetate, Methyl PROPASOL™, Propyl CARBITOL™, Propyl CELLOSOLVE™, Propyl DIPROPASOL™ and Propyl PROPASOL™, among others, all of which are available from Dow Chemical Company of Midland, Mich., U.S.A. Suitable plasticizing solvents, for example, may be selected from ethylene glycol phenyl ether (commercially available as "DOWANOL™ EPh" from Dow Chemical Company), propylene glycol phenyl ether (commercially available as "DOWANOL™ PPh" from Dow Chemical Company); 2,2,4-Trimethyl-1,3-pentanediol diisobutyrate; tributoxy ethyl phosphate; dibasic esters such as dimethyl adipate, dimethyl succinate, dimethyl glutarate, dimethyl malonate, diethyl adipate, diethyl succinate, diethyl glutarate, dibutyl succinate, and dibutyl glutarate (including products commercially available under the trade designations DBE, DBE-3, DBE-4, DBE-5, DBE-6. DBE-9, DBE-IB, and DBE-ME from E.I. du Pont de Nemours and Company, of Wilmington, Del., U.S.A.); dialkyl carbonates such as dimethyl carbonate, diethyl carbonate, dipropyl carbonate, diisopropyl carbonate, and dibutyl carbonate; phthalate esters such as dibutyl phthalate, diethylhexyl phthalate, and diethyl phthalate, among others. Particularly suitable liquid solvents include, without limitation, diethylene glycol monoethyl ether (commercially available under the tradename CARBITOL from The Dow Chemical Company of Midland, Mich., USA) and dipropylene glycol monomethyl ether (also commercially available under the tradename DOWANOL DPM from The Dow Chemical Company).

The liquid solvent may, for example, comprise water in an amount of from 10% to 100%, based on the total weight of the liquid solvent.

In some embodiments, formulations in accordance with the present invention may further comprise one or more alkoxide compounds, in addition to the aforesaid polymer surfactant, liquid solvent and film-forming polymer. Suitable alkoxide compounds have the following Formula II:

$$R_b\text{—O—(PO)}_x\text{-(EO)}_y\text{—H} \qquad \text{Formula II}$$

The (PO) and (EO) moieties may be arranged as two blocks as shown in Formula II. In some embodiments the (PO) and (EO) moieties may have another arrangement such as, for example, blocks with (EO) adjacent to $R_b$—O—, multiple blocks, random distribution, or alternation. In Formula II, x is a real number from 0.5 to 500, and y is a real number from 0 to 500. Also in Formula II, $R_b$ is a hydrogen or a hydrocarbon group with 1 to 20 carbon atoms, or a mixture of two or more hydrocarbon groups with 1 to 20 carbon atoms. Each hydrocarbon group may be linear aliphatic, cycloaliphatic, aromatic, or a combination thereof. In embodiments where one or more alkoxide compounds are present, the formulations may comprise such alkoxide compounds in an amount of from 0.25% to 10%, by weight, based on the total weight of alkoxide compounds and the total weight of the formulation. For example, the one or more alkoxide compounds may be present in an amount of from 0.5% to 8%, or even from 1% to 5%, by weight, based on the total weight of alkoxide compounds and the total weight of the formulation. Each of the one or more alkoxide compounds may, for example, have a $MW_w$ of from 150 to 12,000 Daltons, such as from 150 to 8,000 Daltons, or even from 300 to 4,000 Daltons, as measured by GPC method.

The formulations according to the present invention also comprise one or more film-forming polymers. Film-forming polymers suitable for use in the formulations are acrylic polymers derived from one or more ethylenically unsaturated monomers. The film-forming polymers may also comprise one or more of the following components: acid functional residues, polyvalent metal ion and complex crosslinking agents. Such film-forming polymers are described in, for example, U.S. Pat. Nos. 2,795,564, 3,328,325, 3,467,610, 3,554,790, 3,573,329, 3,711,436, 3,808,036, 4,150,005, 4,517,330, 5,149,745, 5,319,018, 5,574,090, 5,676,741 and 6,548,596.

Methods for preparation of the film-forming polymers suitable for use in the formulation of the present invention are known in the art and not especially limited. The preparation method may be selected from solution, dispersion and emulsion polymerization processes. Emulsion polymerization is especially useful for preparing useful film-forming polymers. The practice of emulsion polymerization is well known and discussed in detail in the literature, for example, in D. C. Blackley, Emulsion Polymerization (Wiley, 1975). The polymerization temperature is typically from ambient temperature up to 90° C. and may also involve use of dispersing agents, initiators, accelerators, emulsifiers, chain transfer agents. As will be readily understood by persons of ordinary skill, dispersing agents may include anionic or nonionic dispersing agents, polymerization initiators may be of the free radical type, such as ammonium or potassium persulphate. The initiators may be used alone or with an accelerator, such as potassium metabisulphite or sodium thiosulphate.

Examples of suitable emulsifiers include, for example, alkaline metal and ammonium salts of alkyl, aryl, alkaryl and aralkyl sulphonates, sulphates, polyether sulphates, and alkoxylated derivatives of fatty acids, esters, alcohols, amines, amides and alkylphenols. Chain transfer agents, including mercaptans, polymercaptans and polyhalogen compounds may be used in the polymerization mixture to control molecular weight of the polymer.

Suitable film-forming polymers may contain, as polymerized units, from 5% to 90%, such as from 5% to 80%, from 5% to 50%, or even from 10 to 20%, of one or more monoethylenically unsaturated monomers containing an acidic functional group selected from one or more of carboxylic, sulfonic and phosphonic groups. For example, suitable carboxylic acid monomers include, without limitation, monoethylenically unsaturated ($C_3$-$C_9$) carboxylic acid monomers, such as unsaturated monocarboxylic and dicarboxylic acid monomers. For example, unsaturated monocarboxylic acids include acrylic acid (AA), methacrylic acid (MAA), alpha-ethacrylic acid, beta-dimethylacrylic acid, vinylacetic acid, allylacetic acid, ethylidineacetic acid, propylidineacetic acid, crotonic acid, acryloxypropionic acid and alkali and metal salts thereof. Suitable unsaturated dicarboxylic acid monomers include, for example, maleic acid, maleic anhydride, fumaric acid, itaconic acid, citraconic acid, mesaconic acid, methylenemalonic acid and alkali and metal salts thereof.

Additional suitable monoethylenically unsaturated monomers containing sulfonic acid or phosphonic groups include, for example, 2-acrylamido-2-methyl-1-propanesulfonic acid, 2-methacrylamido-2-methyl-1-propanesulfonic acid, 3-methacrylamido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrene-sulfonic acid, vinylsulfonic acid, 2-sulphoethyl methacrylate, 3-sulfopropyl acrylate, 3-sulfopropyl methacrylate, sulfomethyl acrylamide, sulfomethyl methacrylamide and phosphoethyl methacrylate.

As a further example, the one or more monoethylenically unsaturated monomers may comprise one or more (meth) acrylic monomers containing one or more pendant reactive functional groups selected from hydroxy, thiol, and amino groups. Suitable hydroxy-functional (meth)acrylic monomers include, for example, hydroxyl ($C_1$-$C_4$)alkyl (meth) acrylates, such as hydroxyethyl methacrylate, hydroxyethyl acrylate, hydroxypropyl methacrylate and hydroxypropyl acrylate. Suitable amino-functional (meth)acrylic monomers include, for example, dimethylaminopropyl methacrylamide, dimethylaminopropyl acrylamide, dimethylaminoethyl methacrylate, dimethylaminoethyl acrylate, dimethyl-aminopropyl methacrylate and dimethylaminopropyl acrylate. Suitable thiol-functional (meth)acrylic monomers include, for example, 2-mercaptopropyl methacrylate.

As a still further example, the one or more monoethylenically unsaturated monomers may comprise one or more ($C_1$-$C_{20}$)alkyl (meth)acrylate ester monomers, such as, without limitation, methyl acrylate, ethyl acrylate, propyl acrylate, isopropyl acrylate, butyl acrylate, isobutyl acrylate, secondary butyl acrylate, tertiary-butyl acrylate, methyl methacrylate, ethyl methacrylate, propyl methacrylate, isopropyl methacrylate, cyclopropyl, methacrylate, butyl methacrylate and isobutyl methacrylate, hexyl and cyclohexyl methacrylate, cyclohexyl acrylate, isobornyl methacrylate, 2-ethylhexyl acrylate (EHA), 2-ethylhexyl methacrylate, octyl (meth)acrylate, decyl (meth)acrylate, isodecyl (meth)acrylate, undecyl (meth)acrylate, dodecyl (meth)acrylate (also known as lauryl (meth)acrylate), tridecyl (meth)acrylate, tetradecyl (meth)acrylate (also known as myristyl (meth)acrylate), pentadecyl (meth)acrylate, hexadecyl (meth)acrylate (also known as cetyl (meth)acrylate), heptadecyl (meth)acrylate, octadecyl (meth)acrylate (also known as stearyl (meth) acrylate), nonadecyl (meth)acrylate, eicosyl (meth)acrylate and combinations thereof. Typically, the ($C_1$-$C_{20}$)alkyl (meth)acrylate esters are ($C_1$-$C_8$)alkyl (meth)acrylate esters and preferably ($C_1$-$C_8$)alkyl acrylate esters; more preferably, the ($C_1$-$C_{20}$)alkyl (meth)acrylate esters are selected from methyl acrylate, ethyl acrylate, butyl acrylate and 2-ethylhexyl acrylate; most preferably, the acrylate esters are selected from butyl acrylate and 2-ethylhexyl acrylate.

The one or more monoethylenically unsaturated monomers used to prepare the film-forming polymers, may comprise one or more vinylaromatic monomers, such as, for example, styrene, alpha-methyl styrene and substituted styrenes, such as vinyl toluene, 2-bromostyrene, 4-chlorostyrene, 2-methoxystyrene, 4-methoxystyrene, alpha-cyanostyrene, allyl phenyl ether and allyl tolyl ether.

It is also possible for the film-forming polymers to comprise, as polymerized units, 0-50%, such as 0-25%, of one or more other copolymerizable monomers. Suitable other copolymerizable monomers include, for example, butadiene, acrylonitrile, methacrylonitrile, crotononitrile, alpha-chloroacrylonitrile, ethyl vinyl ether, isopropyl vinyl ether, isobutyl vinyl ether, butyl vinyl ether, diethylene glycol vinyl ether, decyl vinyl ether, ethylene, methyl vinyl thioether and propyl vinyl thioether, esters of vinyl alcohol, and amides of ethylenically unsaturated ($C_3$-$C_6$)carboxylic acids, amides of ethylenically unsaturated ($C_3$-$C_6$)carboxylic acids that are substituted at the nitrogen by one or two ($C_1$-$C_4$)alkyl groups, acrylamide, methacrylamide and N-methylol (meth)acrylamide.

The formulation for cleaning hard surfaces and leaving a shiny, glossy finish that is substantially streak-free, according to the present invention, comprises: from 20% to 80% by weight of the liquid solvent; from 2 to 80% by weight of the film-forming polymer; and from 0.05 to 10% by weight of the polymer surfactant; all weight percents being based on the total weight of the formulation. In some embodiments, the aqueous coating formulation may comprise from 20% to 70%, or even 35% to 60%, by weight, of the liquid solvent.

In some embodiments, the aqueous coating formulation may comprise from 10 to 60%, or even 25 to 60%, by weight, of the film-forming binder.

In some embodiments, the aqueous coating formulation may comprise from 0.05 to 8%, or even 0.1 to 5%, or even 0.1 to 2.5%, by weight, of the polymer surfactant which comprises polymerized units derived from EO and BO.

Formulations in accordance with the present inventions may be formulated combining the ingredients in any order, as long as the resulting formulation contains at least the above-described polymer surfactant and film-forming polymer.

In embodiments where the formulation of the present invention is used for cleaning hard surfaces, in addition to the above-described polymer surfactant and film-forming polymer, the formulation may also include one or more additional ingredients, referred to hereinafter as "adjuvants." Adjuvants, when present, include, for example, waxes (including, for example, polyolefin waxes such as, for example, polyethylene wax emulsions and polypropylene wax emulsions; and natural waxes such as carnauba), coalescents, surfactants, wetting agents, emulsifying agents, dispersing agents, cosolvents, thickeners (including, for example, alkali swellable resins and alkali soluble resins), preservatives, perfumes, and mixtures thereof. Adjuvants, when present, may be added at any point in the formation of the formulation of the present invention. Some adjuvants, for example, may be added as part of the process of forming the aqueous polymer dispersion and will remain in the formulation. Some adjuvants, for example, may be added to one or more of the ingredients or to one or more of the admixtures, to improve the properties of the formulation. Some of these adjuvants may reside in any one of or any combination of the following locations: inside the suspended particles of the aqueous polymer dispersion, on the surface of the suspended particles of the aqueous polymer dispersion, or in the continuous medium.

Other suitable adjuvants may include enzymes; hydrotropes such as sodium toluene sulfonate, sodium cumeen sulfonate and potassium xylene sulfonate; colorants; dyes or pigments, as long as they do not adversely impact the film-forming and streak-free characteristics of the formulation.

Still other suitable adjuvants include builders, such as, without limitation, polycarboxylates and polyphosphates.

Typically, the formulations of the present invention comprise up to 15% by weight, based on the total weight of the formulation, of one or more builders, such from 01% to 10%, or even from 0.5% to 5.0%.

Most, if not all, such adjuvants are well-known to persons of ordinary skill in the relevant art and their use is not particularly limited in connection with the present invention. It is believed that persons of ordinary skill are already well-equipped and in the best position to assess which, if any, such adjuvants, known now or in the future, may be beneficial depending on the particular formulation and the hard surfaces to which is may be applied.

The present invention also provides a method for providing a high gloss and streak-free finish to hard surfaces which involves applying one or more layers of the above-described formulation to a hard surface, and allowing each layer to dry prior to use or application of another layer.

The use, application and benefits of the present invention will be clarified by the following discussion and description of exemplary embodiments and applications of the formulations present invention.

EXAMPLES

Test Methods

To test the gloss enhancement and streak free performance properties over hard surface substrates, sample formulations were prepared according to the details provided in Tables below. After completely mixed (for 30 minutes), the formulations were allowed to sit at ambient conditions overnight before the surfactant and polymer containing formulations were applied to vinyl substrates [12 inch (305 mm)×12 inch (305 mm)×⅛ inch (3.2 mm) manufactured by Forbo International SA, of Baar, Switzerland, Colovinyl U3P3E2C2 (Black) using a cotton gauze pad 12 ply 13 Thread count, 5 cm×5 cm supplied by Laboratoires Lohmann & Rauscher SAS, of Remiremont, France. The coatings were allowed to dry for 1 hour. Subsequent coats were applied as specified for the type of evaluation that was going to be performed (2 coats to determine gloss), and then the formulations were diluted 2 mL./100 mL with tap water and applied to the coated substrates (2-5 coats to determine gloss, streak, and leveling/wetting performance).

Gloss

Gloss measurements were taken after the films were allowed to dry for 1 hour. The method for determining the gloss is described in "Annual Book of ASTM Standards," Section 15, Volume 15.04, Test Procedure ASTM D 1455 (2000). A Gardner Byk Micro-Tri-Gloss meter, catalog number 4520, was used to record 60° and 20° gloss.

Streaking Test

A vinyl panel approximately 12×12 inches (305 mm×305 mm) is cleaned with a mild detergent to remove any foreign material, rinsed with water and allowed to air dry. 2 grams of each test formulation are uniformly applied by gauze pad to the substrate and the residue is allowed to evaporate. A rating of the streaking on the panel is determined using the following absolute numerical (0-6) scale.

0: none (no visible streaking)
1: mild-none
2: mild
3: mild-moderate
4: moderate
5: moderate-heavy
6: heavy
(This is evaluated at each application and the average rating is recorded.)

Leveling/Wetting:

This test was performed on a black vinyl substrate. The amount of coating applied was 2 grams in the vinyl substrate section. Immediately after the spreading was completed, an "X" was placed in the wet coating by drawing the gauze pad applicator diagonally from corner to corner of the test area. After the residue has dried, it was examined visually to determine the extent of the disappearance of the 'X'". Leveling was rate don the following scale:
- 5: No "X" detectable
- 4: Faint outline of the "X" but no ridges in residue
- 3: Plain outline of the "X", no ridges detectable
- 2: Plain outline of the "X", ridges, and obvious de-wetting or ridging over entire coated area
- 1: Outline of "X", ridges, and obvious de-wetting or ridging over entire coated area Film-Forming Polymers As indicated more specifically below, the following three different film-forming polymers were used in the formulations prepared and evaluated in these examples.

Polymer A:
16MMA/33BA/35Styrene/16MAA//0.76ALMA//0.3nDDM, made according to U.S. Pat. No. 5,574,090, except that 0.3 wt % of n-dodecyl mercaptan on polymer solids was added to provide a molecular weight (weight average basis, $MW_w$) of about 80,000 grams/mole (g/mol).

Polymer B:
40Sty/35BA/9MMA/16MAA+3.0% Zinc (made according to U.S. Pat. No. 5,149,745) and having $MW_w$ (without zinc) of about 400,000 g/mol.

Polymer C:
29BA/52MMA/19MAA+0.56 wt % mercaptopropionic acid, (made according to U.S. Pat. No. 4,196,190) and having a $MW_w$ of about 40,000 g/mol.

Polymer Surfactants

Three different polymer surfactants were included in formulations and their performance evaluated. The surfactants have the following general formula:

$$R_a\text{—O-}(EO)_m\text{—}(PO)_p\text{—}(BO)_n\text{—H},$$

wherein $R_a$, m, n, and p having the following values:

Polymer Surfactant Composition Table

| Surfactant | | $R_a$ | m value | n value | p value |
|---|---|---|---|---|---|
| 1 | Example | $C_{12}H_{25}$ | 9 | 3 | 0 |
| 2 | Comparative | $C_{12}H_{25}$ | 7 | 0 | 3 |
| 3 | Comparative | $C_8H_{17}$ | 6 | 0 | 5 |

A base formulation, Base A, having the following composition was used to make the various cleaning formulations to be evaluated:

| MATERIALS | PARTS BY WEIGHT |
|---|---|
| Water (solvent) | 57.03 |
| Carbitol ™ Solvent, Low Gravity[1] | 4.35 |
| Ucar ™ Filmer IBT | 1.04 |
| Kathon ™ LXE (1.5%) | 0.02 |
| Polymer (38%) | 35.10 |
| Ultralube E-671N (35%)[2] | 2.46 |
| TOTAL | 100.00 |

Nominal Solids 15%
Polymer/ASR/Wax: 94/0/6
[1] Diethylene glycol monoethyl ether
[2] Wax emulsion from Keim Additec For each test formulation, 1 gram (or part) of one of the polymer surfactants was added, and the test results for these formulations are provided in Tables 1, 2 and 3.

TABLE 1

| | Performance properties Sample | |
|---|---|---|
| | Base A | Base A |
| | Polymer | |
| | Polymer A | Polymer A |
| | Surfactant added | |
| | Surfactant 1 | Surfactant 2 |
| Nominal solids | — | — |
| Solids content measured % | 15% | 15% |
| Gloss over vinyl tile | 35 | 36 |
| Recoat gloss over vinyl tile | 60 | 55 |
| Properties: | | |
| Leveling | 5 | 5 |
| DPC 1 | 59 | 54 |
| DPC 2 | 60 | 52 |
| DPC 3 | 62 | 50 |
| DPC 4 | 63 | 52 |
| DPC 5 | 65 | 54 |

DPC: Dilutable polish cleaners dilution used 2 ml/100 ml

TABLE 2

| | (Formulation at 15%) | | | | | |
|---|---|---|---|---|---|---|
| | Polymer | | | | | |
| | A | A | A | C | C | A |
| | Surfactant | | | | | |
| | 1 | 2 | 3 | 1 | none | None |
| Gloss | | | | 51 | 48 | |
| Recoat Gloss | 73 | 55 | 59 | 53 | 50 | 59 |
| DPC 1 | 69 | 54 | 66 | 50 | 44 | 69 |
| DPC 2 | 60 | 52 | 57 | @ | @ | 59 |
| DPC 3 | 62 | 50 | 56 | @ | @ | 60 |
| DPC 4 | 64 | 52 | 57 | @ | @ | 60 |
| DPC 5 | 63 | 54 | 57 | @ | @ | 62 |
| Streaking | | | | | | |
| DPC 1 | 0 | 3 | 3 | 0 | 4 | 3 |
| DPC 2 | 0 | 4 | 4 | @ | * | 4 |
| DPC 3 | 0 | * | * | @ | * | * |
| DPC 4 | 0 | * | * | @ | * | * |
| DPC 5 | 0 | * | * | @ | * | * |
| Leveling/Wetting | | | | | | |
| DPC 1 | 5 | 5 | 1 | 5 | 5 | 5 |
| DPC 2 | 5 | 5 | 1 | 5 | @ | 5 |
| DPC 3 | 5 | 5 | 1 | 5 | @ | 5 |
| DPC 4 | 5 | 5 | 1 | 5 | @ | 5 |
| DPC 5 | 5 | 5 | 1 | 5 | @ | 5 |

* Streak assessment not provided because streaking occurred on previous applications
Leveling/Wetting assessment stopped because leveling/wetting issues occurred on previous applications
@ not tested

TABLE 3

(Formulation at 10%)

| | Polymer A Surfactant 1 | Polymer A Surfactant 3 | Polymer A Surfactant None |
|---|---|---|---|
| Gloss | 45 | 49 | 42 |
| Recoat Gloss | 64 | 67 | 60 |
| DPC 1 | 62 | 63 | 59 |
| DPC 2 | 60 | 64 | 51 |
| DPC 3 | 62 | 64 | 53 |
| DPC 4 | 63 | 65 | 54 |
| DPC 5 | 65 | 65 | 54 |
| Streaking | | | |
| DPC 1 | 0 | 0 | 0 |
| DPC 2 | 0 | 0 | 4 |
| DPC 3 | 0 | 4 | 4 |
| DPC 4 | 0 | 4 | 4 |
| DPC 5 | 0 | 4 | 4 |
| Leveling/Wetting | | | |
| DPC 1 | 5 | 2 | 1 |
| DPC 2 | 5 | 2 | 1 |
| DPC 3 | 5 | 2 | 1 |
| DPC 4 | 5 | 2 | 1 |
| DPC 5 | 5 | 2 | 1 |

Another base formulation, Base B, having the following formulation was used to make additional various cleaning formulations that were evaluated:

| MATERIALS | PARTS BY WEIGHT |
|---|---|
| Water (solvent) | 37.43 |
| Primal ™ E-1531B (38%) | 3.15 |
| Zonyl FSJ (1%) | 1.00 |
| NOPCO NXZ | 0.02 |
| Carbitol ™ Solvent, low Gravity[1] | 4.50 |
| Dowanol DPM ™ [2] | 2.50 |
| Ucar ™ Filmer IBT | 1.25 |
| Kathon ™ LXE (1.5%) | 0.03 |
| Tributoxyethylphosphate | 1.60 |
| Polymer B (38%) | 53.68 |
| Permanol HDL (35%)[3] | 5.04 |
| Permanol AP5 (40%)[4] | 1.89 |
| TOTAL | 112.09 |

Polymer/ASR/wax ratio: 85/5/10
Nominal solids: 24%
[1]Diethylene glycol monoethylether
[2]Dipropylene glycol monomethyl ether
[3]Hard polyethylene wax
[4]Modified polypropylene wax For each test formulation, 1 gram (or part) of one of the polymer surfactants indicated below was added, and the test results for these formulations are provided in Table 4.

TABLE 4

Formulations with Base B at 15% solids, and Polymer B as the film-forming polymer

| | Polymer B Surfactant none | Polymer B Surfactant 2 | Polymer B Surfactant 1 |
|---|---|---|---|
| Gloss | 43 | 45 | 44 |
| Recoat Gloss | 61 | 55 | 57 |
| DPC 1 | 59 | 50 | 51 |
| DPC 2 | 47 | 49 | 50 |
| DPC 3 | 42 | 47 | 45 |
| DPC 4 | 37 | 50 | 46 |
| DPC 5 | 38 | 51 | 47 |
| Streaking | | | |
| DPC 1 | 4 | 4 | 1 |
| DPC 2 | 4 | 2 | 1 |
| DPC 3 | 4 | 3 | 0 |
| DPC 4 | 6 | 3 | 1 |
| DPC 5 | 6 | 3 | 1 |
| Leveling/Wetting | | | |
| DPC 1 | 1 | 1 | 4 |
| DPC 2 | 1 | 3 | 5 |
| DPC 3 | 2 | 3 | 4 |
| DPC 4 | 2 | 3 | 4 |
| DPC 5 | 2 | 3 | 4 |

What is claimed is:

1. A formulation for cleaning hard surfaces comprising:

A) one or more liquid solvents;

B) one or more film-forming polymers having a weight average molecular weight of at least 80,000 g/mol and comprising;

(i) polymerized units derived from one or more ethylenically unsaturated monomers; and (ii) one or more acid functional residues, polyvalent metal ions and complex crosslinking agents; and C) one or more polymer surfactants, each comprising polymerized units derived from ethylene oxide and butylene oxide and having the following general Formula I:

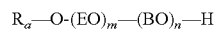

$$R_a-O-(EO)_m-(BO)_n-H \quad \text{Formula I}$$

wherein $R_a$ is one or more independently straight chain or branched alkyl groups or alkenyl groups having 3-22 carbon atoms, EO is a polymerized unit derived from ethylene oxide, m is from ±5 to 12, BO is a polymerized unit derived from butylene oxide, and n is from ±3 to 8, and wherein the molecular weight for one or more polymer surfactants of Formula I is from 150 to 1,500 Daltons;

wherein, application of said formulation to hard surfaces provides a shiny appearance free of streaking.

2. The formulation according to claim 1, comprising from 20% to 80% by weight of the one or more liquid solvents, based on the total weight of the formulation.

3. The formulation according to claim 1, comprising from 5% to 80% by weight of the one or more film-forming polymers, based on the total weight of the formulation.

4. The formulation according to claim 1, comprising from 0.5% to 10% by weight of the one or more polymer surfactants comprising polymerized units derived from ethylene oxide and butylene oxide, based on the total weight of the formulation.

5. A formulation for cleaning hard surfaces comprising:
A) one or more liquid solvents;
B) one or more film-forming polymers having a weight average molecular weight of at least 80,000 g/mol and comprising;
   (i) polymerized units derived from one or more ethylenically unsaturated monomers; and
   (ii) one or more acid functional residues, polyvalent metal ions and complex crosslinking agents; and
C) one or more polymer surfactants, each comprising polymerized units derived from ethylene oxide and butylene oxide and having the following general Formula I:

$R_a$—O-(EO)$_m$—(BO)$_n$—H   Formula I wherein, for the one or more polymer surfactants, $R_a$ is a straight chain $C_{12}$ hydrocarbon, m is from 9 to 12, and n is from 2 to 3.

6. The formulation according to claim 1, wherein the at least one of said one or more film-forming polymers comprises polymerized units derived from at least acrylic acid and methyl methacrylate.

7. The formulation according to claim 6, wherein the at least one of said one or more film-forming polymers further comprises polymerized units derived from butyl acrylate.

8. The formulation according to claim 1, further comprising:
(D) one or more alkoxide compounds.

9. A method for providing a high gloss and streak-free finish to hard surfaces, comprising applying one or more layers of the formulation according to claim 1 to said hard surfaces, and allowing each layer to dry prior to use or application of another layer.

* * * * *

UNITED STATES PATENT AND TRADEMARK OFFICE
CERTIFICATE OF CORRECTION

PATENT NO.        : 8,911,560 B2
APPLICATION NO.   : 13/929046
DATED             : December 16, 2014
INVENTOR(S)       : Valerie Perdigon et al.

It is certified that error appears in the above-identified patent and that said Letters Patent is hereby corrected as shown below:

In the Claims

In Column 12, line 49, change ±5 to 5
In Column 12, line 50, change ±3 to 3

Signed and Sealed this
Twenty-seventh Day of October, 2015

Michelle K. Lee
*Director of the United States Patent and Trademark Office*